United States Patent [19]

MacLeod

[11] 4,174,031
[45] Nov. 13, 1979

[54] LUBRICATING SYSTEM AND METHOD

[75] Inventor: Donald R. MacLeod, Ottawa, Wis.

[73] Assignee: Rexnord Inc., Milwaukee, Wis.

[21] Appl. No.: 890,737

[22] Filed: Mar. 27, 1978

[51] Int. Cl.² .......................... B65G 45/02; F16N 7/24
[52] U.S. Cl. ........................................ 198/501; 184/6;
308/20
[58] Field of Search .................. 308/20, 187; 198/501;
184/6, 6.17, 7 R, 7 C, 7 CR, 8, 1 D

[56] References Cited

U.S. PATENT DOCUMENTS

| | | | |
|---|---|---|---|
| 1,958,412 | 5/1934 | Andrada et al. | 308/20 X |
| 2,728,415 | 12/1955 | LeClair | 184/7 CR |
| 3,334,727 | 8/1967 | Rieser | 308/20 X |
| 3,338,381 | 8/1967 | Imse | 198/501 |
| 3,797,609 | 3/1974 | Bertaud | 308/20 X |
| 3,892,306 | 7/1975 | Bertaud | 198/501 |
| 3,960,243 | 6/1976 | DiAntonio | 184/6 |
| 4,051,921 | 10/1977 | Sheldon | 184/1 D |

Primary Examiner—David H. Brown
Attorney, Agent, or Firm—Raymond E. Fritz, Jr.; Vance A. Smith; Ernst W. Schultz

[57] ABSTRACT

A series of conveyor idler roll shafts in end-to-end relation supported by bearings provides a pressurized chamber for the flow of grease or oil to the bearings from a reservoir, which is capable of pumping the lubricant into the axial bore of each shaft. Small, radially directed holes connect the shaft bores to the bearings by providing a restricted passage having across it a suitable pressure drop capable of allowing lubricant to flow in sufficient quantities to each bearing regardless of its distance from the reservoir pressure source. Adjacent shaft ends are connected with a resilient cylindrical tubular coupler to provide the requisite flow passage continuity. A labyrinth seal provides a continuous path for lubricant to flow through the bearings, the seal and ultimately to the exterior of the system, where its appearance is visible and indicative of adequate lubricant flow to each bearing along the shaft assembly.

10 Claims, 2 Drawing Figures

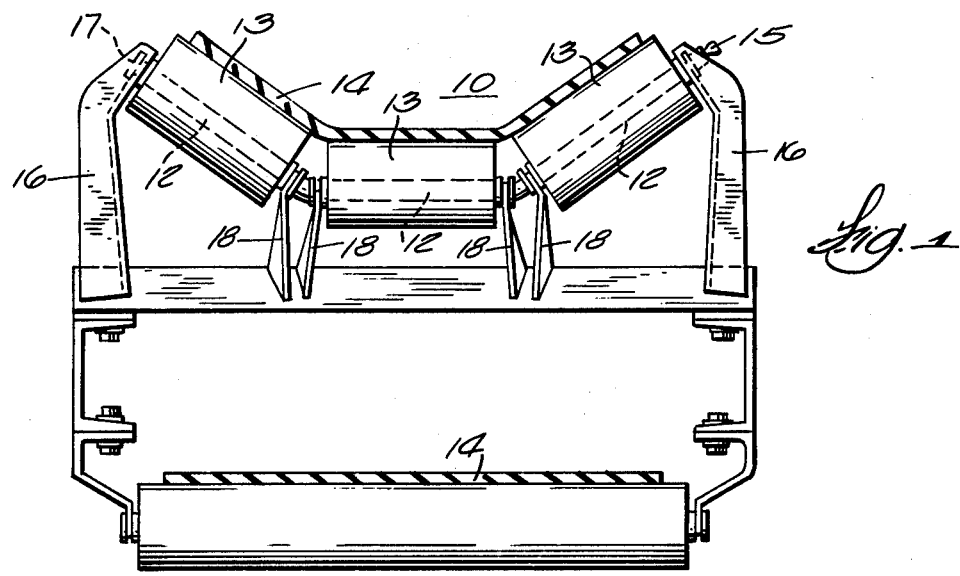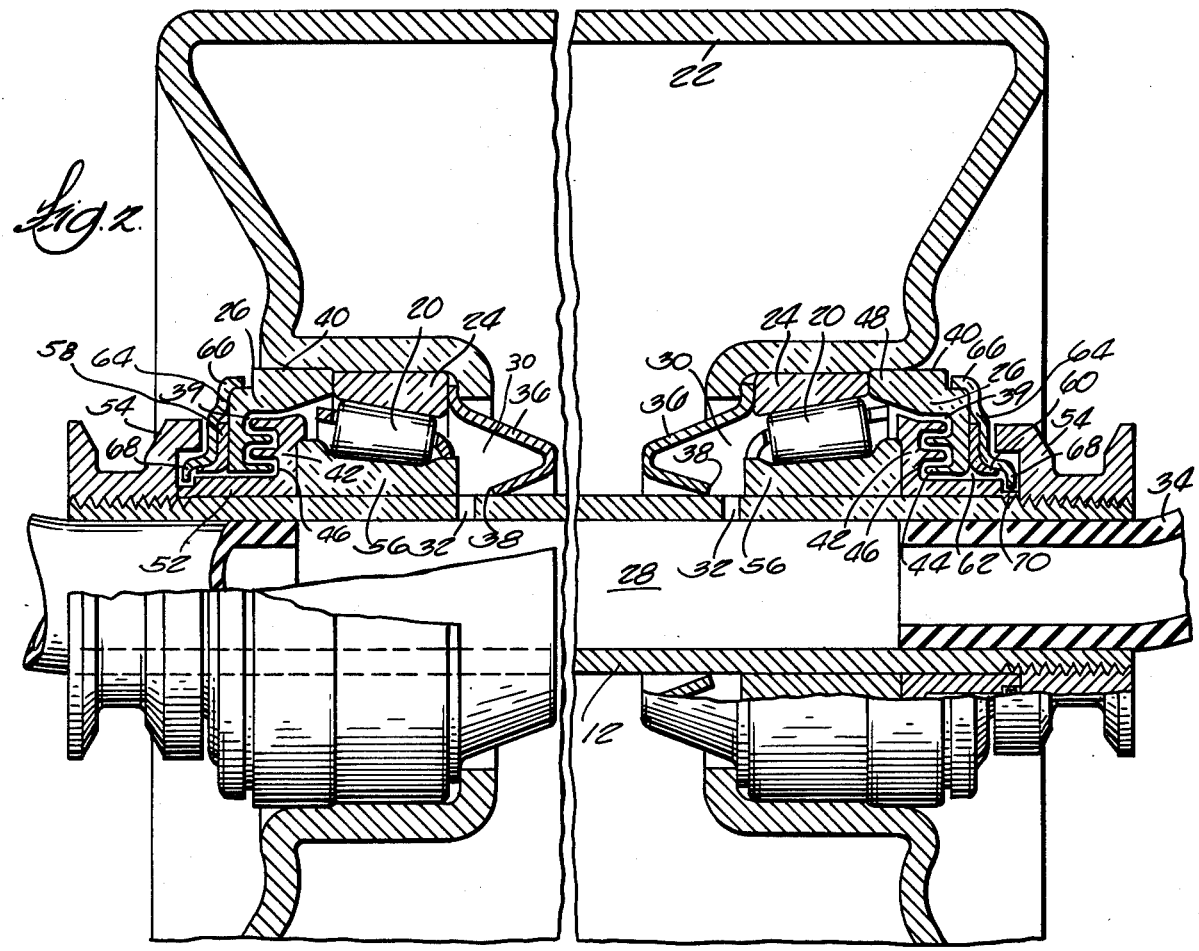

LUBRICATING SYSTEM AND METHOD

BACKGROUND OF THE INVENTION

1. Field of the Invention

This invention relates to a lubricating system for bearings and in particular to a system for supplying lubricant across the width of a belt conveyor idler assembly to bearings that are at varying distances from a pressure source supplying lubricant to the system.

2. Description of the Prior Art

Belt conveyor systems typically carry raw and processed materials such as mined ore, crushed rock, coal, phosphated fertilizers and other such abrasive, corrosive, powdered material in a process environment which requires reliable, continuous service and operation. Bearings, which support the loads traveling on these conveyors, are particularily susceptible to failure in view of the offensive environment in which they perform and the speeds and loads involved. Unless supplied continually with an adequate lubricant, excessive wear results and the ultimate failure of the bearing is assured. Process industry personnel typically prefer to lubricate conveyor bearings from one side of the conveyor only, with a view to saving time and cost, and because access to bearings on both sides of the conveyor is often unpredictable and unavailable. Even if access were available from both sides, intermediate bearings are not readily within view or reach of the lubrication attendant. For these reasons idler bearing systems have been designed with the remote lubrication feature as a requirement.

Clearance seals, generally of the labryrinth type, are commonly in use at the outer ends of the individual shaft segments because of their satisfactory performance characteristics relating to efficiency, as measured by power absorbed in the form of frictional losses, and their ability to seal the bearings against inward migration of abrasive, corrosive contaminants. As a further precaution against bearing failure from such foreign matter, the lubrication system should provide capability for flow outward from the inner side of the bearing in sufficient quantities and rate of flow as to flush out the offensive material in the outward wash of lubricant.

U.S. Pat. Nos. 3,797,609 and 4,051,921 apply to the subject matter of this invention. The former is related to a method for supplying lubricant to the support bearings of a belt conveyor idler by means of tubular members which connect a spindle to the bearings. The length of the tubes and their diameters are chosen to establish a pressure drop in the tube between the spindle and the bearing so that lubricant will flow to each bearing regardless of its distance from the pressure source. As the distance from the pressure and lubricant source increases, as it necessarily must for each bearing position across the conveyor width, the pressures drop in the spindle supply passage will accumulate to such a degree that there will be substantially less pressure in the passage at the most distant bearing than exists at the bearings closest to the source. This produces a condition which can result in insufficient and inadequate lubricant supply to the most distant bearings, the ultimate failure of the bearing, and substantial down-time for replacement.

The second patent cited discloses an attempt to increase the amount of lubricant flowing to the more distant bearings by means of a constriction placed over or adjacent the orifice created by radial holes leading from the major supply passage to the bearing. This approach required the placement of minuscule plugs in the bore of the shaft at locations precisely positioned to constrict flow from the radial hole. It caused undue delay in the fabrication process since shop operators who handle equipment of the size and bulk of conveyor components are unaccustomed to tedious and exacting work of this sort.

SUMMARY

A series of conveyor idler shafts in end-to-end relation, supported by bearings, provides a pressurized chamber for the flow of grease or oil to the bearings from a reservoir, which is capable of pumping the lubricant into the axial bore of each shaft. Small, radially directed holes connect the shaft bores to the bearings by providing a restricted passage having across it a suitable pressure drop capable of allowing lubricant to flow in sufficient quantities to each bearing regardless of its distance from the reservoir pressure source. Adjacent shaft ends are connected with a resilient cylindrical tubular coupler to provide the requisite flow passage continuity. A labyrinth seal provides a continuous path for lubricant to flow through the bearings, the seal and ultimately to the exterior of the system, where its appearance is visible and indicative of adequate lubricant flow to each bearing along the shaft assembly.

The paramount technical difficulty in providing a reliable through-lubricating system is in assuring sufficient lubricant supply to the bearings that are situated at the opposite side of the conveyor from the side to which the pressurized reservoir source of lubricant is fixed for supply. Holes carrying the flow to those bearings from a large supply passage will, if made large enough, have a sufficiently low pressure drop along their length to allow enough lubricant to pass. On the other hand, if this large size cross hole is maintained throughout the system regardless of the proximity of the hole to the pressure source, or, more correctly, regardless of the pressure drop from the hole to the pressure source, the flow may entirely be to the nearest bearings, with none going to those more distant from the source.

An object of this invention is to provide a reliable and nearly equal lubricant supply to each bearing across the conveyor width regardless of its distance from the side to which the lubricant source is applied.

BRIEF DESCRIPTION OF THE DRAWING

FIG. 1 is a front elevation view of a three roll idler assembly supporting a belt conveyor and a one roll idler assembly supporting the return portion of the belt.

FIG. 2 is a partial cross-section taken through a shaft centerline of one idler roll assembly.

DESCRIPTION OF THE PREFERRED EMBODIMENT

This invention is described with reference to an idler assembly having several rolls arranged generally in end-to-end relation across the width of a belt conveyor, but has application in other arrangements apparent to those skilled in related art. FIG. 1 shows an idler roll assembly 10 for such a conveyor, which consists, in this illustration of a commonly used configuration, of shafts 12 with three idler rolls 13 mounted for rotation on the shafts 12. Generally the outer rolls have their axes canted in respect to the axis of the center roll, which is arranged in a horizontal plane, so that the combination forms a trough to better contain the conveyed material against cascading over the sides and off a belt 14, which engages and drives the idler rolls.

The assembly 10 is supported by end brackets 16 and center brackets 18 joined at their base to structure that ultimately carries the loads to ground. The endless belt 14 turns at the end terminals of the conveyor course about a pulley and returns empty on the underside of the forward moving belt. Located at the end of at least one of the outer shafts is a lubrication fitting 15 which communicates with the bore 28 of the shafts 12 to accept a standard grease gun, if grease is the lubricating medium, or another such device capable of injecting the lubricant at pressure into the fitting and to the shaft bore. The opposite end of the shaft assembly is sealed against outward flow of lubricant by a plug 17 or possibly another lubricating fitting capable of unidirectional flow into, but not out of, the system.

A detailed view of an individual roll is illustrated in FIG. 2 and shows a shaft 12, rotary bearings 20 mounted on the shaft, an idler roll shell 22 journaled to the bearing outer race 24 and a seal assembly 26 protecting the bearings 20 from infiltration of abrasive contaminants. The shaft 12 is provided with an axial bore 28 which carries lubricant from the lubricating fitting at an end of the idler roll assembly 10 to the other end. Adjacent to each bearing 20 is a bearing cavity 30 which is periodically charged with grease. Access to the cavity 30 from the bore 28 is by way of radial restrictions 32 in the form of small cross holes formed at each axial shaft station that aligns with the cavity 30. It has been found in testing that one such cross hole 32 at each cavity 30 location gives suitable flow of lubricant when applied with standard, commercially available grease guns capable of developing pumping pressure in the range of 100 to 400 pounds per square inch (gauge).

Grease flow continuity between adjacent shafts is provided by a flexible tube 34, which may have a braided fiber reinforcement of a plastic or rubber matrix, inserted within the axial bores 28 of adjacent shafts 12, sized with its outside diameter approximately equal to the bore 28 diameter, and extending within each bore 28 to a distance about in-line with the lateral centerline of the bearing 20. Care should be taken, of course, to assure the tube 34 does not extend so far within the shafts 12 as to cover over the cross holes 32. The tube 34 has been found to provide a means for supply of a residual volume of lubricant to the bearings after the pressurized lubricant source is removed from the system. The tube expands radially under this pressure, stores an amount of lubricant in excess of its static volume, and, upon disengagement of the pressure source, contracts to its ambient state, thereby delivering the additional volume to the system.

Cavity 30 is sealed on its inner periphery by a rear seal 36 of the positive seal type, which increases sealing contact forces at the shaft interface 38 as cavity pressure increases.

At the outer side of each bearing 20, a seal assembly 26 is located to prevent the entrance of foreign material to the bearing from the outside environment. The seal assembly 26 consists of a labyrinth 39 made of an outer portion 40 and an inner portion 42, each having axial projections 44 that fit within recesses 46 arranged to accept the projections, the portions 40, 42 intermeshing and being positioned on the outside diameter of the shaft 12. An outer flange 48 abuts the outer race 24 of the roller bearing 20; an inner flange 52 contacts a nut 54 threaded on the shaft outside diameter, which bears on the inner race 56 to position the bearing 20 to its proper position on the shaft 12. A rubber washer 58 is fitted over the outer seal portion 40, has an outwardly turned flange 60, which flexes to clear the inner flange 52 when grease flows but contacts flange 52 at other times, and provides, by way of this clearance, a continuation of the lubrication passage 62. Over the washer 58 is placed a metal retainer 64 having an upper flange 66, which engages a shoulder on the outer seal portion 40, and a lower flange 68, which clears a lip 70 on the inner seal portion 42.

The lubrication passage 62 is continuous through the seal assembly 26, past the clearance at the flange 60 of the washer 58, in stepwise fashion inwardly around the clearances provided between the inner seal portion lip 70 and the lower flange 68 of the retainer 64, and outward between the retainer 68 and the inner surface of the nut 54.

The lubrication system is charged by a standard grease gun at a grease fitting 15 at one end of the conveyor width, which fitting communicates with the axial bore 28 of the shaft 12. Grease is introduced at pressure, fills the bore 28 from the grease fitting to the opposite end where the bore is sealed, and fills the flexible tube couplers 34 which connect adjacent shaft ends. Once the system is charged to capacity, additional amounts of grease that are input by the grease gun raise the static pressure in the bore 28 and cause grease to flow from the bore through the small radial restrictions 32 formed in the walls of the shaft 12 at each bearing cavity 30. The flow fills the cavities 30, continues through the spaces bettween adjacent rollers of the bearing 20, into the labyrinth passage 39 through passage 62, and eventually is seen extruding outwardly between the nut and the retainer 64.

It has been discovered that, if the radial restrictions 32 are limited in size and number at each cavity 30 location, an adequate supply of grease will be supplied to each bearing regardless of its distance from the pressure source. The pressure drop caused by the restrictions 32 must be great enough so that, upon having the system charged to capacity, incremental additions of grease input the system will not exit at the restriction 32 nearest the pressure source. Instead, if the pressure drop associated with grease flow down the bores is maintained at a small enough magnitude in relation to the drop across each restriction 32, the predominant flow continues down the bore. The static pressure in the bore 28 will experience a stepwise discontinuity at each restriction 32, a result of the necessary outward flow of grease at each restriction, however small it may be. Quantities of grease passing through the restrictions nearest the pressure source will necessarily be greater than the flow at the more distant restrictions if an identical radial hole size is used to form each restriction throughout the system. On the other hand, restriction size can be varied along the shaft at discrete locations to produce a nearly uniform quantity of grease flow from each restriction. Alternatively, the dimensions of the shaft bore and its length can be varied between restriction stations to control the pressure drop within the bore, while maintaining restriction sizing variables uniformly throughout.

The various combinations capable of giving the desired results can be summarized by considering the following variables: a shaft bore having the diameter D and the length L between any two radial restrictions on the same shaft; a radial restriction having the diameter d and a length l through the shaft wall thickness. A series of tests have been conducted to verify the ability of a system using these variables, configured as above described, to adequately supply grease in nearly equal amounts to individual radial holes and thus to the bearings, which are distributed down the length of connected shafts at differing distances from a pressure source. The test results have been consolidated in a non-dimensional number $[D/d]^6[l/L]$, which has been found to be a measure of the adequacy of lubricant supply to a particular bearing in relation to the flow to the entire system.

The quantity of grease extruding out each seal assembly was weighed and calculated as a fractional part of the total outflow. Grease flow is considered adequate where the amount of outflow from a particular bearing seal is no less than five percent of the total amount exiting from all seals of the system; accordingly the non-dimensional number, $[D/d]^6[l/L]$, must have a value of 4000 for the success criteria to be met. In tests conducted with this number below 4000, there was a definite tendency for the more distant bearing seals to have substantially less grease outflow than the mean value of 16.7 percent, and for the closer seals to have substantially more outflow than the mean. The threshold value for the non-dimensional number is therefore a measure of the extent to which the pressure drop in the bore is low enough in relation to the pressure drop through a radial restriction hole, and explains in part, the reason why flow to any bearing can be metered by the restriction holes alone, provided they are kept small in relation to the bore. For example, in tests using commercially sized equipment hole sizes of 0.052 inch diameter and smaller were found to produce satisfactory results.

Relative terms such as small and large, long and short are unified by reference to the non-dimensional number, which can be modified for application to systems having shapes other than the circular cross-sectioned bore and radial restrictions holes used herein to this point. Furthermore, where more than one radial restriction hole 32 is located so as to communicate with a bearing cavity 30, and where each such hole is of a different size or shape from the others, the non-dimensional number can be modified accordingly. For the case of non-circular holes 32 or bores 28 that require a multiple number of individual hole dimensions to calculate their cross-sectional area, an equivalent diameter, $D_{eq}$ or $d_{eq}$, can be calculated and substituted for D or d respectively, as is commonly done in the hydraulic arts, by dividing four times the cross-sectional area A of the hole or bore by the wetted perimeter of the hole or bore P, i.e. $d_{eq}$, $D_{eq}=4A/P$. In the instance where a multiple number n of radial restriction holes 32 allow lubricant to flow to a particular bearing cavity 30, the equivalent diameter can be substituted in the non-dimensional number for the term d, provided that the equivalent diameter is calculated by dividing four times the total cross-sectional area of the holes 32 that communicate with a particular bearing cavity 30 by the total wetted perimeter of those holes, i.e.

$$d_{eq} = \frac{4 \sum_n A}{\sum_n P}.$$

The non-dimensional number can be calculated using equivalent diameters where applicable and necessary and is equally predictive of the relative flow from individual bearing seals, provided the holes have roughly equivalent cross-sectional dimensions and do not approach the shape of a narrow slit.

I claim:

1. The combination with a belt conveyor idler assembly having at least one shaft with an axial bore supported on bearings, a seal adjacent the bearings providing a passage for the flow of lubricant therethrough, a lubrication fitting at one end of the shaft communicating with the shaft bore for supplying lubricant under pressure to the shaft bore from a pressurized source of lubricant which engages the lubrication fitting, wherein the improvement comprises:

small holes through the walls of the shaft for providing lubricant to flow therethrough from the bore to the bearing so that the lubricant pressure drop through the shaft bore is negligible in comparison to the pressure drop through said holes; said holes having a diameter equal to or less than 0.052 inch; and means for sealing the shaft bore against flow of lubricant except through said holes.

2. The combination of claim 1 wherein at least one hole through the shaft wall is located adjacent each bearing for lubricant to flow thereto.

3. The combination of claim 1 wherein the bearing and the seal provide a continuous path for the passage of lubricant through the bearing and outwardly through the seal.

4. The combination of claim 1 wherein the shaft is constructed of a plurality of such shafts in end-to-end relation having the shaft bores of adjacent shafts connected by a means for providing a continuous path for the flow of lubricant in the shaft bores.

5. The combination of claim 4 wherein the shaft bores are connected by radially expandable tubes which expand when lubricant is supplied to the system from a pressurized source of lubricant and contract when the pressure is removed.

6. The combination with a belt conveyor idler assembly having two or more shafts with axial bores arranged in end-to-end relation, each shaft supported on bearings, a seal adjacent the bearings providing a passage for the flow of lubricant therethrough, a lubrication fitting at one end of the shaft communicating with the shaft bore for supplying lubricant under pressure to the shaft bore from a pressurized source of lubricant which engages the lubrication fitting, wherein the improvement comprises:

small holes through the walls of the shafts for providing lubricant to flow therethrough from the bores to the bearing cavities so that the pressure drop through the shaft bores is negligible in comparison to the pressure drop through said holes; said holes having a diameter equal to or less than 0.052 inch;

means for sealing the shaft bores against flow of lubricant except through said holes; and means for connecting adjacent shafts with a passage for providing a continuous path for the flow of lubricant in the shaft bores which has a pressure drop that is negligible in comparison to the pressure drop through said holes.

7. The combination of claim 6 wherein the bearing and the seal provide a continuous path for the flow of lubricant through the bearing and outwardly through the seal.

8. The combination of claim 1 or claim 6 wherein said holes vary in size as the distance of the hole location from the pressure source varies.

9. The combination of claim 1 or claim 6 wherein the diameters d of said holes at each bearing, the lengths l of said holes through the walls of the shaft at each bearing, the shaft bore diameter D, and the shaft length L between bearings on an individual shaft when combined to form the non-dimensional number $[D/d]^6[l/L]$ result in a value for said number equal to or greater than 4,000.

10. The combination of claim 9 wherein the shaft bore diameter D and the diameters d of said holes through the walls of the shaft at each bearing are represented in said non-dimensional number by their equivalent diameters.

* * * * *